United States Patent

Minatogawa et al.

[19]

[11] Patent Number: 5,983,231
[45] Date of Patent: Nov. 9, 1999

[54] INSTANCE UPDATING METHOD AND APPARATUS THEREFOR

[75] Inventors: Masamitsu Minatogawa, Toyama; Maki Sakuta, Kawasaki; Kazuko Ichie, Toyama; Chikako Momoyama, Toyama; Takahiro Hayashi, Toyama; Yuhko Hanada, Toyama; Tomonori Suda, Kawasaki, all of Japan

[73] Assignee: Fujitsu Limited, Kawasaki, Japan

[21] Appl. No.: 09/026,617

[22] Filed: Feb. 20, 1998

Related U.S. Application Data

[62] Division of application No. 08/527,129, Sep. 12, 1995, Pat. No. 5,752,250.

[30] Foreign Application Priority Data

Dec. 2, 1994 [JP] Japan .................................. 6-299425
Dec. 28, 1994 [JP] Japan .................................. 6-326543

[51] Int. Cl.$^6$ .................................................. G06F 17/30
[52] U.S. Cl. .............................. 707/102; 707/3; 707/200; 707/500
[58] Field of Search ................................. 707/200, 500, 707/102, 3

[56] References Cited

U.S. PATENT DOCUMENTS

| | | | |
|---|---|---|---|
| 4,648,036 | 3/1987 | Gallant | 707/203 |
| 5,146,552 | 9/1992 | Cassorla et al. | 707/500 |
| 5,185,698 | 2/1993 | Hesse et al. | 364/419 |
| 5,202,984 | 4/1993 | Kashio | 707/200 |
| 5,212,789 | 5/1993 | Rago | 707/8 |
| 5,247,658 | 9/1993 | Barrett et al. | 707/1 |
| 5,247,684 | 9/1993 | Tavares et al. | 707/8 |
| 5,276,793 | 1/1994 | Borgendale et al. | 395/148 |
| 5,341,293 | 8/1994 | Vertelney et al. | 364/419.17 |
| 5,355,476 | 10/1994 | Fukumura | 707/1 |
| 5,355,477 | 10/1994 | Strickland et al. | 707/8 |

(List continued on next page.)

FOREIGN PATENT DOCUMENTS

| | | |
|---|---|---|
| 63-49928 | 3/1988 | Japan . |
| 3-224061 | 10/1991 | Japan . |
| 5-108636 | 4/1993 | Japan . |

OTHER PUBLICATIONS

Dantzig et al, A Distributed Connection Manager Interface for Web Services on IBM Systems, Parallel and Distributed Systems, 1996. Proceedings., 1996 International Conference, pp. 2–9, Jun. 1996.

Lakshmanan et al, A Declarative Language for Querying and Restructing the Web, Research Issues in Data Engineering, Sixth International Workshop, pp. 12–21, Feb. 1996.

Sengupta et al, Query by Templates: A Generalized Approach query formulation for text Dominated Databases, Digital Libraries, 1997. ADL Proceedings., IEEE International Forum, pp. 36–47, May 1997.

*Primary Examiner*—Thomas G. Black
*Assistant Examiner*—Frantz Coby
*Attorney, Agent, or Firm*—Staas & Halsey

[57] ABSTRACT

An instance updating method in which an instance of a database displayed by a list can be updated in such a manner that only necessary item is updated when necessary. The instances read from the database are displayed by a list in a state in which inputting is impossible. When an instance to be updated is selected and a command for updating is given, the field of the selected instance is changed into a state in which inputting is possible. After appropriate input is effected, when a command for input confirmation is given, the instance is rewritten into the inputted content, and the instance is returned to the state in which inputting is impossible. The updated instance is reflected in the original database. In a method of generating a fixed format document necessary for carrying out a regular process on marked documents from a marked document already created and preserved, a prepared marked document is read. Then, a mark name in the read document is searched for and retrieved, and a mark name start mark, the retrieved mark name, a mark name end mark, and a marked content end mark are set. The marked content is skipped and is not retrieved.

9 Claims, 16 Drawing Sheets

U.S. PATENT DOCUMENTS

| | | | |
|---|---|---|---|
| 5,467,268 | 11/1995 | Sisley et al. | 705/9 |
| 5,506,951 | 4/1996 | Ishikawa | 395/157 |
| 5,513,350 | 4/1996 | Griffin et al. | 395/702 |
| 5,537,587 | 7/1996 | Kelley et al. | 707/200 |
| 5,546,579 | 8/1996 | Josten et al. | 707/8 |
| 5,557,722 | 9/1996 | DeRose et al. | 395/148 |
| 5,572,729 | 11/1996 | Giordano et al. | 707/200 |
| 5,574,899 | 11/1996 | Kinoshita | 707/1 |
| 5,574,952 | 11/1996 | Brady et al. | 395/888 |
| 5,590,269 | 12/1996 | Kruse et al. | 705/9 |
| 5,625,844 | 4/1997 | Takaya | 395/853 |
| 5,632,027 | 5/1997 | Martin et al. | 711/170 |
| 5,644,776 | 7/1997 | DeRose et al. | 395/761 |
| 5,651,059 | 7/1997 | Morgan et al. | 379/207 |
| 5,706,503 | 1/1998 | Poppen et al. | 707/100 |
| 5,708,806 | 1/1998 | DeRose et al. | 707/104 |
| 5,787,295 | 7/1998 | Nakao | 395/761 |

| TITLE | PREPARER | DATE |
|---|---|---|
| REPORT (2) | B. B. | 1994. 08. 01 |
| REPORT (1) | A. A. | 1994. 07. 01 |
| REPORT (2) | B. B. | 1994. 08. 01 |
| PLAN | C. C. | 1994. 08. 15 |
| REPORT (3) | D. D. | 1994. 09. 01 |

FIG. 2

```
TITLE    :   REPORT (1)
PREPARER :   A. A.
   DATE  :   1994. 07. 01

TITLE    :   REPORT (2)
PREPARER :   B. B.
   DATE  :   1994. 08. 01

TITLE    :   PLAN
PREPARER :   C. C.
   DATE  :   1994. 08. 15
```
— 10

FIG. 3

| ( DOCUMENT NAME ) | ( KEYWORD ) |
|---|---|
| DOCUMENT 1 | MARKING |
| DOCUMENT 1 | REGULAR PROCESSING FORMAT |
| DOCUMENT 1 | AUTOMATIC GENERATION |
| DOCUMENT 2 | SCREEN FORMAT |
| DOCUMENT 2 | LEDGER FORMAT |
| DOCUMENT 2 | CHARACTER EXPRESSION |
| DOCUMENT 3 | FULL TEXT SEARCH |
| DOCUMENT 3 | [ POINTER = 121 - 154TH BYTE ] |

```
─────< MARKED DOCUMENT >─────────────────────
                                              ─50
  (ATHDOC
  -         QUESTIONNAIRE ON GRADUATION
                                STUDY¥n¥nNAME:
  AKIND CDATA NAME
  (ATHMARK
  -SAKURAI TAKEHIRO
  )ATHMARK
  -¥nUNIVERSITY:
  AKIND CDATA UNIVERSITY
  (ATHMARK
  -TOYAMA UNIVERSITY
  )ATHMARK
  -  FACULTY:
  AKIND CDATA FACULTY
  (ATHMARK
  -SCIENCE
  )ATHMARK
  -FACULTY  DEPARTMENT:
  AKIND CDATA DEPARTMENT
  (ATHMARK
  -CHEMISTRY
  )ATHMARK
  -DEPARTMENT¥n¥nENTER THE SUBJECT OF
             YOUR GRADUATION STUDY ¥n
  AKIND CDATA GRADUATION STUDY
  (ATHMAR
  -RELATION BETWEEN RAMAN INTENSITY AND
              CRYSTAL STRUCTURE
  )ATHMARK
  -¥n¥n
  )ATHDOCD
```

FIG. 12

―<FIXED FORMAT DOCUMENT>―

QUESTIONNAIRE ON GRADUATION STUDY

NAME : (NAME)  *
UNIVERSITY : (UNIVERSITY)  *FACULTY: (FACULTY)  *DEPARTMENT: (DEPARTMENT)  *DEPARTMENT

ENTER THE SUBJECT OF YOUR GRADUATION STUDY.
(GRADUATION STUDY) *

INSTANCE UPDATING METHOD AND APPARATUS THEREFOR

This application is a division of prior application U.S. Ser. No. 08/527,129, filed Sep. 12, 1995 now U.S. Pat. No. 5,752,250.

BACKGROUND OF THE INVENTION (1) Field of the Invention

The present invention relates to a method of updating instances and, more particularly, to a method of updating instances of a database displayed on a list in an interactive mode.

The present invention also relates to a method and apparatus for generating a fixed format document from a marked document, and more particularly, to a method and apparatus for generating, from a marked document electronically created by a word processor, text editor or the like, a fixed format document which is required for a subsequent regular process.

(2) Description of the Related Art

Documents in an electronic medium can be used as a database by storing them. To use such data assets, keywords contained in the document may be displayed, or they may be updated as necessary.

For the database, likewise, only the instances for which the special condition is met in a field may be searched for and displayed, or the displayed instances may be updated as necessary.

In an electronic document, a document keyword corresponds to an instance in database, and a document corresponds to a record in database. Therefore, in the following description, the instance in a database includes the document keyword unless otherwise noted.

Conventionally, when the management of instances in a database including displaying and updating thereof is carried out, the displaying has been performed by a list, and the updating has been performed by a special-purpose input screen. For the displaying, the items to be displayed are specified in advance, and the instances in one record are displayed in a form of list, corresponding to these items. The display by a list enables the operator to refer to a plurality of records for the particular item at a time, and to look at many records continuously by a scroll operation. For the updating, an input screen in a ledger format, as seen on the screen for a card type database, is prepared. Through this special-purpose input screen, the instances are updated. This input screen displays the instance of each item for one record, so that the updating can be performed by correcting the instance of the intended item.

Generally, as described above, the instances in a database are displayed by a list, and when an instance is changed, an individual object, that is, a special-purpose input screen is used for each record.

As another updating method, a method in which the entire list can be updated may sometimes be used, as seen in a spread sheet.

With the method in which displaying is performed by a list, and updating is performed by a special-purpose input screen, however, if the instances are to be updated while being displayed by a list, the display screen must be changed into an input screen each time the updating is performed. Therefore, the efficiency in updating is poor.

With the method in which the entire list can be updated, all instances are in a state in which they can be updated. Therefore, there is a risk of inadvertently updating an unintended instance.

It is conventionally known to preserve a document with marks affixed to certain meaningful character strings contained therein, and among others, an SGML (Standard Generalized Markup Language) document is known as a typical example of marked document. In the SGML, a visually recognizable mark affixed to a meaningful character string is called tag, and the tag is inserted before and after the character string.

As a format of the SGML, ESIS (Element Structure Information Set) is known. The ESIS format is composed of a sequence of lines, and each line consists of the initial character of a command and one or more parameters. The command can be used as a mark and a parameter may be a meaningful character string.

By searching a marked document for a mark, a specific character string in the document can be retrieved. This allows a marked document to be used as part of a collection of data in a database, and the retrieved character string can be modified so as to be displayed on-screen or printed in desired format.

Usually, to create a document, an ordinary end user may use commercially available word processing software or a dedicated word processing machine. In the case of creating a marked document, however, end users must observe certain rules relating to marking. Therefore, when marked documents are to be created, the marking rules must be previously notified in writing to all end users concerned so that the marked documents may be created in conformity with the rules.

However, even if the rules are notified in writing, it is difficult to have all end users obey the marking rules, because the understanding of the rules and the skill in producing documents differ from user to user. As a consequence, an administrator or a proxy therefor must make the necessary corrections to the marked documents collected from the end users concerned, which requires infinite labor.

SUMMARY OF THE INVENTION

An object of the present invention is to provide an instance updating method in which an instance of a database displayed by a list can be updated in such a manner that only necessary item is updated when necessary.

To achieve the above object, there is provided an instance updating method for updating an instance of a database. This instance updating method includes the steps of reading necessary instances from a storage medium storing the assembly of instances; displaying the read instances by a list in a state in which inputting is impossible; changing a field of at least selected instance into a state in which inputting is possible in accordance with the selection of instance to be updated from the displayed instances and the command for updating of the instance; returning the field to the state in which inputting is impossible in accordance with the command for input confirmation after a new instance is inputted, and displaying the inputted content as a new instance; and writing back the updated content to the storage medium.

Another object of the present invention is to provide an instance updating apparatus for updating an instance of a database. This instance updating apparatus includes an external storage unit in which document files are stored, an instance read device for reading instances from a document file stored in the external storage unit, a memory device loading the read instances, a list preparing device for changing the instances loaded in the memory device into a format represented by a predetermined list display format, an event analysis device analyzing various events including the command for updating an instance to change the instance selected for the list preparing device into the state in which updating is possible, an instance input device having an instance storage device writing back the updated instance in the memory means to the external storage means, and a display unit displaying a list of instances prepared by the list preparing device.

The above and other objects, features and advantages of the present invention will become apparent from the following description when taken in conjunction with the accompanying drawings which illustrate preferred embodiments of the present invention by way of example.

Further object of the present invention is to provide a method of generating a fixed format document necessary for carrying out a regular process on marked documents, from a marked document already created and preserved.

To achieve the above object, there is provided a fixed format document generation method for generating a fixed format document from a marked document containing a mark name and a marked content specified by the mark name. The fixed format document generation method comprises the steps of: reading a marked document created according to marking rules; searching for and retrieving a mark name contained in the read marked document; setting a mark name start mark; setting the retrieved mark name after the mark name start mark; setting a mark name end mark after the set mark name; setting a marked content end mark after the mark name end mark; and skipping a marked content without retrieving the same.

BRIEF DESCRIPTION OF THE DRAWINGS

FIG. 2 is a view showing one example of a screen displaying a list of instances;

FIG. 3 is a view showing another example of a screen displaying a list of instances;

FIG. 9 is a view typically showing the content of a keyword management file;

FIG. 12 is a diagram showing an example of marked document;

FIG. 13 is a diagram showing an example of fixed format document;

DESCRIPTION OF THE PREFERRED EMBODIMENTS

One embodiment of the present invention will be described in detail below with reference to the drawings.

Figure 1:
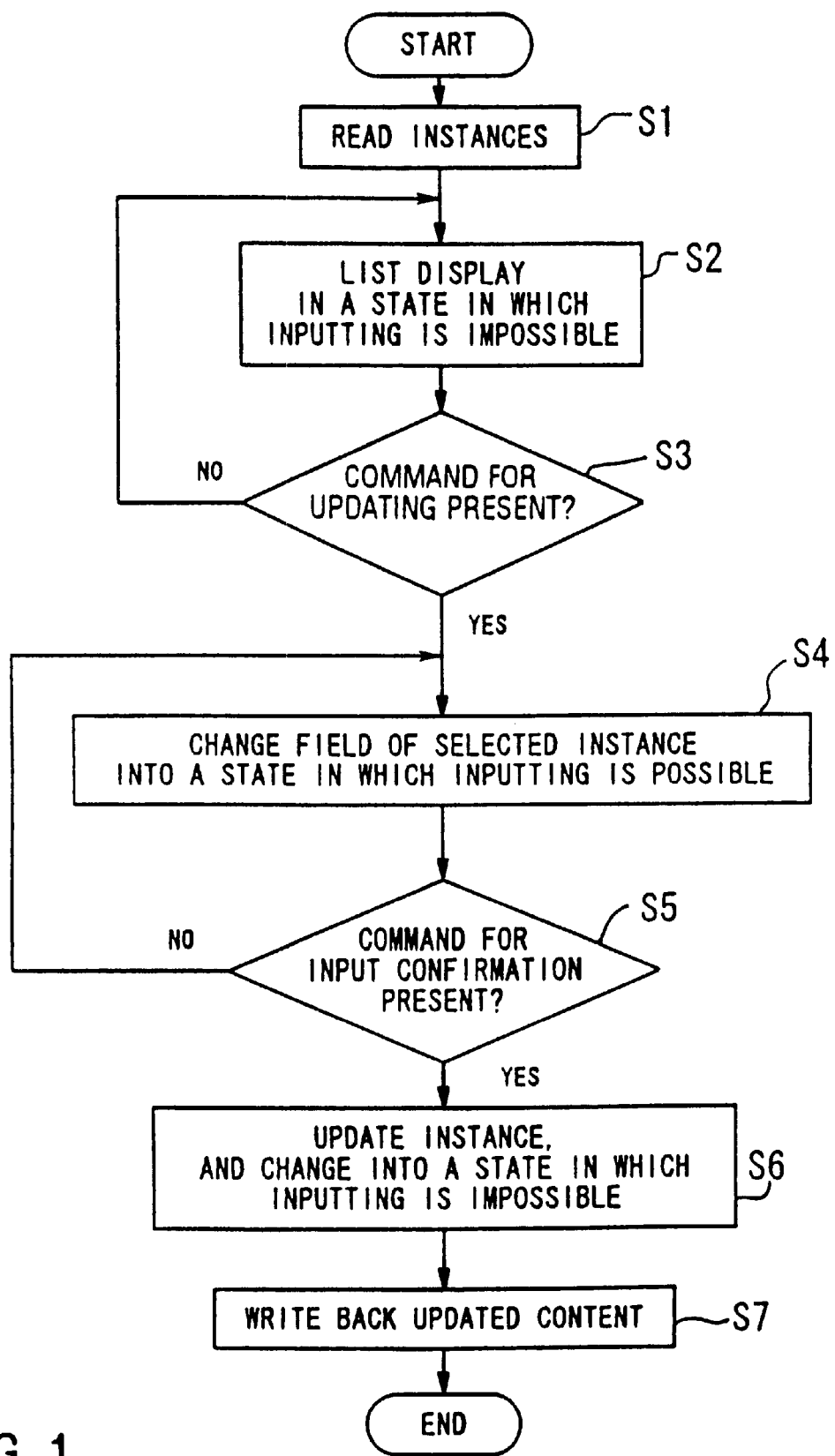
FIG. 1 is a flowchart showing a method of the present invention.

FIG. 1 is a flowchart showing a method of the present invention. According to this flowchart, instances corresponding to the necessary data items are first read from a data file composed of an assembly of instances in a database (Step S1). Then, the read instances are displayed by a list. At this time, the list of instances is displayed in a state in which inputting is impossible (Step S2). In the next step, it is determined whether a command for selecting an instance to be updated and for updating it is present (Step S3). If a command for updating is not present, the list display of instances is continued in a state in which inputting is impossible. If a command for selecting and updating instance is present, the field of the selected instance only is changed into the state in which inputting is possible (Step S4). Then, it is determined whether a command for input confirmation is present (Step S5). Until the command for input confirmation is present, the state in which inputting is possible is maintained. If the command for input confirmation is present after a new instance is inputted, the instance is rewritten into the inputted content, and displayed on the list, and the inputting of instances is made impossible (Step S6). The updated content is written back to the assembly of instances in the database and stored (Step S7).

Thus, when the particular instance among the instances displayed in a form of list is to be updated, that instance is selected and a command for updating is issued, by which only the instance whose update is commanded is put in the state in which updating is possible. After the instance is updated in the state in which updating is possible, the state in which updating is impossible is restored. The updated content is written back to the assembly of instances in the database.

The instances displayed on the list may be document keywords in an electronic data document prepared by a personal computer or a word processor, in addition to the data items of the record in a database. The document may be written by, for example, SGML, which is a language for describing the document structure and other attributes. In the SGML document, a tag is attached to a character string having a meaning such as title and preparer in the document, that is, the document keyword. Therefore, the instance is read for list display by searching for and extracting the document keyword to which the particular tag is attached in the SGML document. The updated instance is stored by searching the appropriate document, searching for the document keyword to which the corresponding tag is attached in that document, and rewriting that document keyword.

FIG. 2 is a view showing one example of a screen displaying a list of instances. In this example, the particular items to be displayed on the list are arranged in the horizontal direction, and the document keywords corresponding to these items in one document are displayed horizontally. This is called a horizontal list display.

When the instances are read from each document and a horizontal list is displayed, the names of items to be displayed on the list, "title", "preparer", and "date" are displayed in an item display zone 4 at the upper part of a screen 2. In an instance display zone 6 under the item display zone 4, the read instances are displayed. In the list display in the state in which inputting is impossible, the instance display zone 6 is located just under the item display zone 4.

When the content of the item displayed on the list is to be changed, the instance to be changed is first selected. The instance is selected by using the arrow keys on the keyboard or a pointing device such as a mouse. The selected instance is displayed in such a manner as to explicitly show that it has been selected for change. In the example shown in FIG. 2, the selected instance is identified by an underline. However, the selected instance may be enclosed by a frame, or changed in a color tone.

Next, the update of the selected instance is commanded. The command for updating is issued by a key on the keyboard, or by using a commanding device such as a pull-down menu, a pop-up menu, or a tool bar, and by selecting, for example, the "instance update" command described on the device.

After the instance update is commanded, the instance display zone 6 lowers by one line, and an instance edit zone 8 appears between the item display zone 4 and the instance display zone 6 as shown in FIG. 2. In this instance edit zone 8, an input frame is set for each item so that the selected instance can be changed. In the input frame for each item in the instance edit zone 8, the selected instance is displayed as it is as an initial value.

After the instance is changed properly, the input confirmation is commanded. The input confirmation is commanded by selecting, for example, the "end" command in the pull-down menu. Then, the instance edit zone 8 disappears. The instance display zone 6 moves up by one line, returning to the original position. The screen 2 returns again to the list display in the state in which inputting is impossible. The selected instance is rewritten into the changed instance on the list.

The instance thus updated and inputted is subsequently reflected in the original document. Specifically, the updated instance is written back to the original document, and the original document is updated. When the instance displayed on the list is changed from the list, the corresponding instance in the original document is updated. Therefore, this list display screen enables a plurality of documents to be edited as one document.

In this example, if some instance is selected, other instances of the document including that instance are selected at the same time, so that a plurality of instances relating to that document can be changed at the same time. However, the method can be configured so that when one instance is selected, only that instance is changed.

FIG. 3 is a view showing another example of a screen displaying a list of instances. In this example, the particular items to be displayed on the list are collected for each document and displayed in the vertical direction. This is called a vertical list display.

When the instances are read from each document and a vertical list is displayed, the item names for each document, "title", "preparer", and "date", and the instances corresponding to these items are displayed, and the documents are separated by a separation line 10. The documents which cannot be displayed can be displayed by scrolling the screen.

Similarly, in this vertical list display, when an instance is to be changed, it can be changed from this list. Specifically, the instance to be changed is selected, and updating is commanded. Then, the zone in which that instance is displayed becomes in the state in which inputting is possible. At this time, the instance is changed and the input confirmation is commanded. The display on the list is changed into a new instance, and the state in which inputting is impossible is again returned. Afterward, the new instance is reflected in the original document.

Here is shown an example in which when the updating of one instance is commanded, only that instance can be changed. However, an example will be shown below, in which when the updating of one instance is commanded, other instances of the document including that instance can also be changed at the same time.

Figure 4:
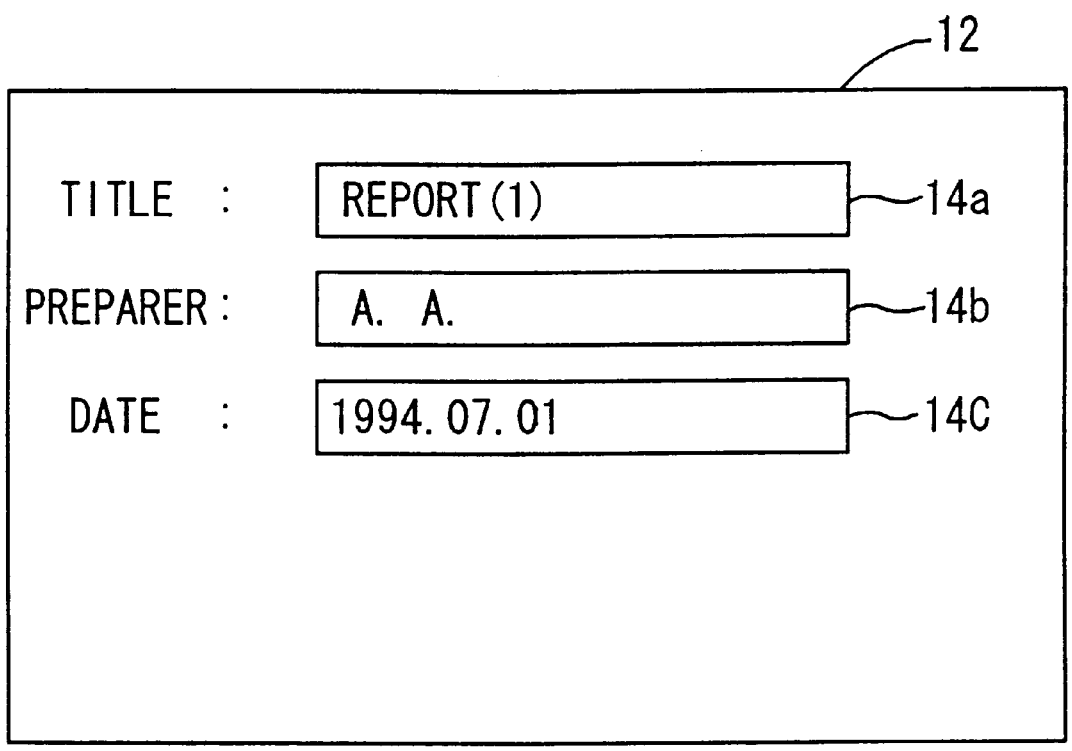
FIG. 4 is a view showing one example of an instance updating screen which appears when an instance updating command is issued on a vertical list display.

FIG. 4 is a view showing one example of an instance updating screen which appears when an instance updating command is issued in a vertical list display. In the vertical list display of instances as shown in FIG. 3, when the updating of some instance is commanded, a window opens, for example, at the upper part of the list display, and an instance updating screen 12 is displayed in the window.

On the instance updating screen 12, input frames 14*a*, 14*b*, and 14*c* are set so that other instances of the document including the selected instance can be changed. In each of the input frames 14*a*, 14*b*, and 14*c*, the selected instance is displayed as it is as an initial value.

After necessary changes of the instances are made through the instance updating screen 12, the input confirmation is commanded. Then, the window of the instance updating screen 12 disappears, and the original vertical list display screen of instances is returned.

Figure 5:
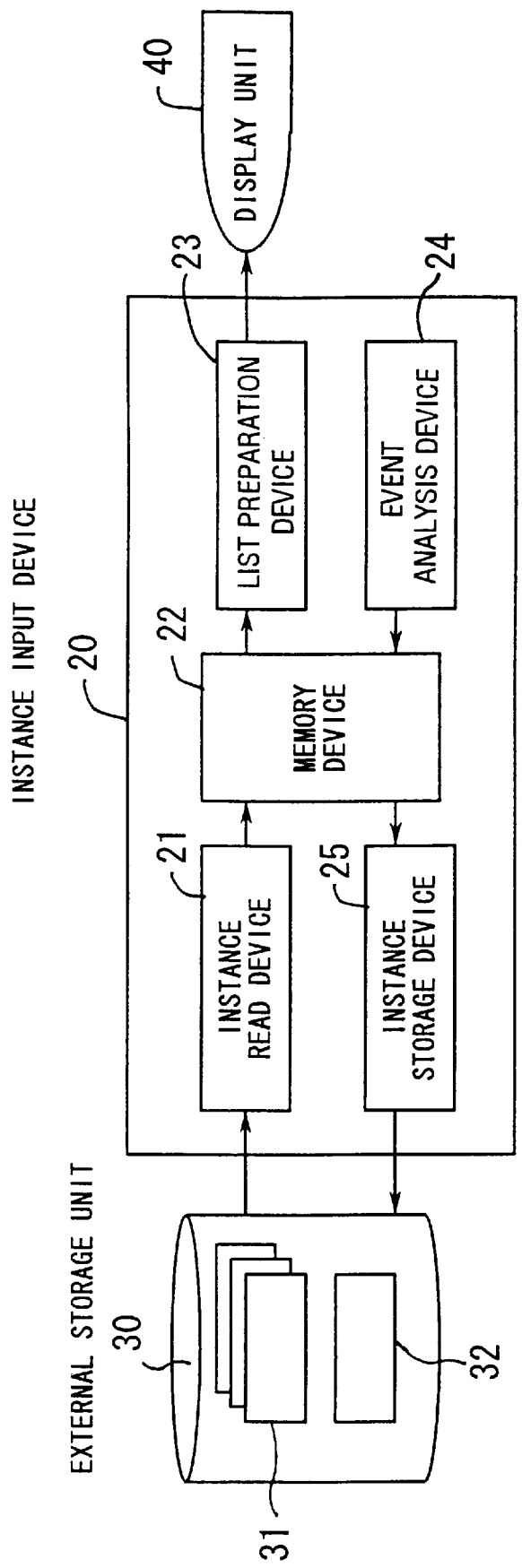
FIG. 5 is a block diagram showing a configuration of an instance updating apparatus.

FIG. 5 is a block diagram showing a configuration of an instance updating apparatus. The instance updating apparatus comprises an instance input device 20, an external storage unit 30 connected to the instance input device 20, and a display unit 40. The instance input device 20 comprises an instance read device 21 for reading the instances from document files 31 stored in the external storage unit 30, a memory device 22 for loading the read instances, a list preparation device 23 for the preparing data on a list displayed on the display unit 40 in a form of the horizontal or vertical list display, an event analysis device 24 for analyzing events such as a command for updating an instance, and an instance storage device 25 for writing back the updated instance in the memory device 22 to the external storage unit 30.

To display a list of instances, the instance read device 21 of the instance input device 20 opens the document file 31 stored in the external storage unit 30, searches for and extracts the intended keywords, and loads them in the memory device 22. The list preparation device 23 arranges the instances loaded in the memory device 22 in accordance with a predetermined form of list display, for example, the form of horizontal list display shown in FIG. 2, to prepare a list, and sends it to the display unit 40. The display unit 40, receiving the data of list from the list preparation device 23, displays the list.

When an instance is changed, the event analysis device 24 analyzes the command for selecting and updating the instance, and tells this fact to the list preparation device 23. As shown in FIG. 2, the list preparation device 23, receiving this notice, puts the instance edit zone 8 under the item display zone 4, and sets input frames in which the selected instance can be changed. The event analysis device 24 also rewrites the appropriate instance in the memory device 22 in accordance with the command for input confirmation after the change of instance. The rewritten instance is immediately reflected in the preparation of the list in the list preparation device 23, and the updated list is displayed by the display unit 40. The rewritten instance in the memory 22 is written back to the document file 31 in the external storage unit 30 by the instance storage device 25. Therefore, the instance storage device 25 identifies the document file 31 stored in the external storage unit 30 from the storage position of the rewritten instance, and searches for the appropriate instance in the document file 31 and rewrite it.

In a preferable embodiment, a keyword management file 32, in which the keywords in the document files 31 to be read by the instance read device 21 are extracted and stored in one file, is stored in an external storage unit 30, and is read when the instance read device 21 reads the keywords of the document files 31.

Normally, when the instance read device 21 reads the keywords of the document files 31, a process in which each file is opened for each document file, the intended keyword is searched for and read, and the file is closed is executed repeatedly. In this embodiment, the keywords of the document files 31 are collectively managed by the keyword management file 32. Therefore, the instance read device 21, when reading the keyword of the document file 31, reads the keyword management file 32 only. This offers advantages that the file is opened only once when the file is read, and the reading of keywords of a plurality of document files can be performed continuously. In addition, the list display of instances can be achieved quickly.

Usually, the character string extracted from the document file is stored as a keyword in a management file for searching in a form of table. For this reason, to the external storage unit 30 is connected a keyword management device for generating a keyword management file 32 by extracting the keyword from the document file 31.

Figure 6:
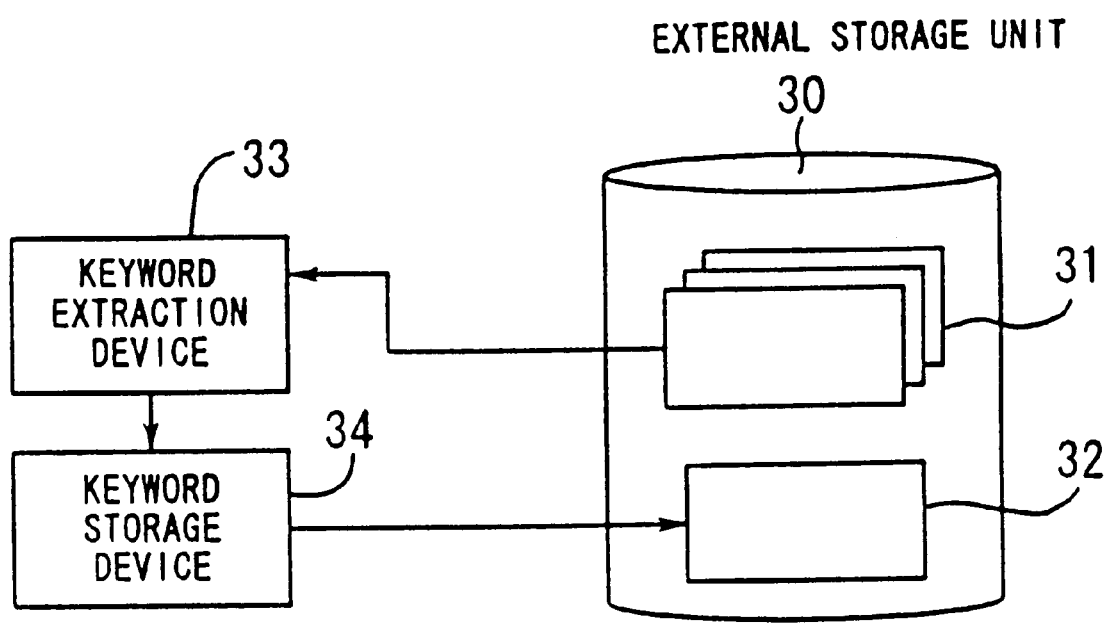
FIG. 6 is a view showing a typical configuration of a keyword management device.

FIG. 6 is a view showing a typical configuration of a keyword management device. The keyword management device comprises a keyword extraction device 33 for extracting the keywords from the document files 31 in the external storage unit 30 and a keyword storage device 34 for storing the extracted keywords in the keyword management file 32 in the external storage unit 30.

The keyword extraction device 33 extracts the keywords predetermined for all document files 31. The extracted keywords are stored in the keyword management file 32 by the keyword storage device 34. Each time one of the document files 31 is updated, the keyword is extracted for the updated document file 31, and the keyword management file 32 is also updated. When the next instance is read by the instance read device 21, the instance is read from this updated keyword management file 32.

The keyword management file 32 stores keywords in a form of table. The record length of the keyword storage table defined by the keyword management file 32 is usually set in advance so as to be the expected maximum length because the number of characters of the keyword extracted from the document file 31 by the keyword extraction device 33 is arbitrary.

Accordingly, the character string exceeding the record length of the keyword storage table used in the keyword management file 32 cannot be used for searching for the keyword, and the keyword of character string exceeding the record length cannot be stored. However, if the record length is set too long, one more file with substantially the same content and a large size is prepared as the keyword management file 32 when all of the extracted keywords are close to the number of characters of a set length.

For this reason, the keyword management device is so configured that the character string exceeding the record length of the keyword storage table can also be stored. Specifically, when the keyword extracted from the document file 31 is stored in the keyword management file 32, the upper limit of the number of stored characters is established. For the keyword up to this upper limit, the character string thereof is stored in the keyword management file 32. For the keyword exceeding the upper limit of the number of stored characters, the information representing the occurrence position in the document file storing the keyword is stored in the keyword management file 32. The upper limit of the number of stored characters is normally equal to the record length of the keyword storage table.

Figure 7:
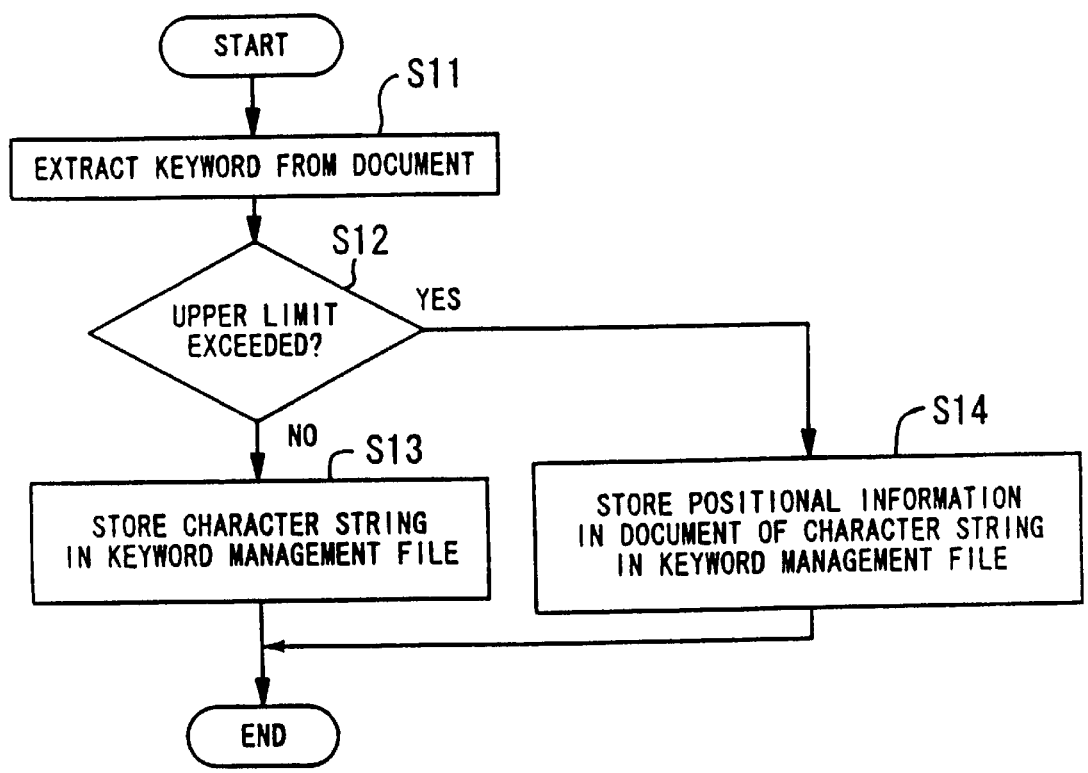
FIG. 7 is a flowchart showing the operation of a keyword extraction device.

FIG. 7 is a flowchart showing the operation of a keyword extraction device.

According to this flowchart, the keyword extraction device 33 first extracts the keyword from the document file 31 stored in the external storage unit 30 (Step S11). Next, it is determined whether the extracted keyword exceeds the upper limit of the preset number of stored characters (Step S12).

In Step S12, if it is judged that the extracted keyword does not exceed the upper limit of the number of stored characters, the character string of that keyword is stored in the keyword management file 32 in the external storage unit 30 by the keyword storage device 34 (Step S13). In the judgment in Step S12, if the extracted keyword exceeds the upper limit of the number of stored characters, the positional information in the document file in which that keyword exists is stored in the keyword management file 32 in the external storage unit 30 by the keyword storage device 34 (Step S14).

Figure 8:
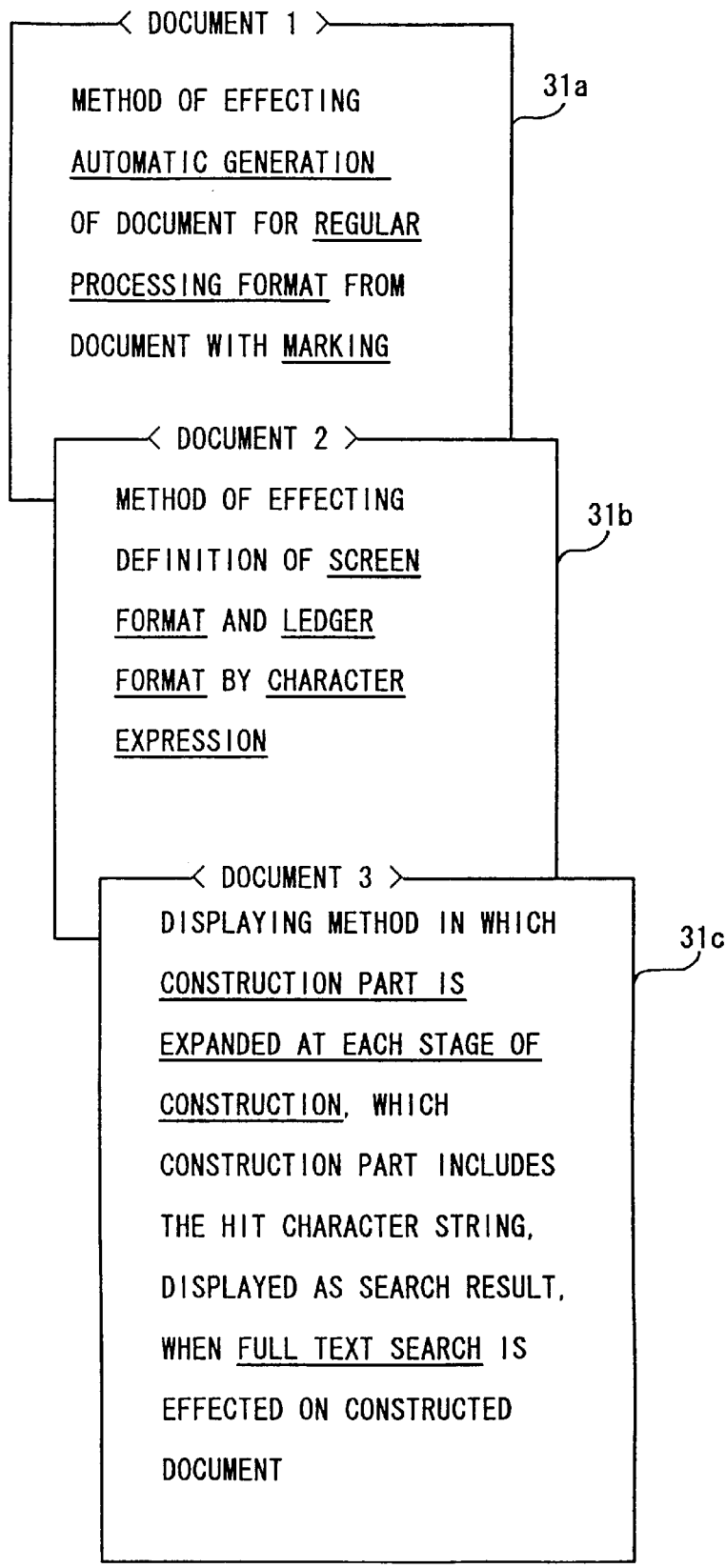
FIG. 8 is a view typically showing the document content of a document file.

FIG. 8 is a view typically showing the document content of a document file. In the illustrated example, there exist three document files 31a, 31b, and 31c, whose document names are "document 1", "document 2", and "document 3". In these documents, the character strings extracted as keywords are underlined to distinguish from other character strings. For example, the character strings set as keywords in "document 1" are "automatic generation", "regular processing format", and "marking". The keywords in these documents are extracted and stored in the keyword management file 32 by the keyword management device 34.

FIG. 9 is a view typically showing the content of a keyword management file. The keyword management file 32 consists of a corresponding table having two items of "document name" and "keyword". The upper limit of the number of stored characters in the field of "keyword" is set, for example, as to be up to 20 characters in alphanumeric character (20 bytes). For the keyword of the number of stored characters up to this upper limit, therefore, the character string thereof is stored as it is in the field of "keyword".

If the number of characters of the extracted character string exceeds the upper limit of the number of stored characters like the first keyword in "document 3" shown in FIG. 8, the character string of that keyword is not stored as it is in the keyword management file 32, but the information as to the position where that character string appears in the document is stored in the keyword management file 32. In the illustrated example, for example, it is indicated that the first keyword in "document 3" exists between the 28th byte and the 86th byte, counting from the head of the document.

When the instance read device 21 reads instances from the keyword management file 32 in the external storage unit 30, in which keywords and positional information exist in a mixed manner, not from the document file 31 in the external storage unit 30, whether the information stored as a keyword is a keyword or positional information is considered.

If the information read from the keyword management file 32 is positional information of keyword, the document file 31c storing that keyword is first opened, the character string in the document file 31c pointed by the positional information of the keyword is taken out, and the character string is regarded as the instance for list display. After the character string has been taken out, the document file 31c is closed at a proper time.

The keyword management file 32 in the external storage unit 30 can also be used for simple keyword search in addition to the keyword search for reading of instances. If the keyword is searched for without using the keyword management file 32, when full text search is performed, all document files must be opened, and the character strings to be searched for must be collated with all character strings in the document. On the other hand, if the keyword management file 32, in which keywords and positional information exist in a mixed manner, is used, all the operator has to do is to open the document file relating to the registered positional information, if any, in addition to the opening of the keyword management file 32.

Figure 10:
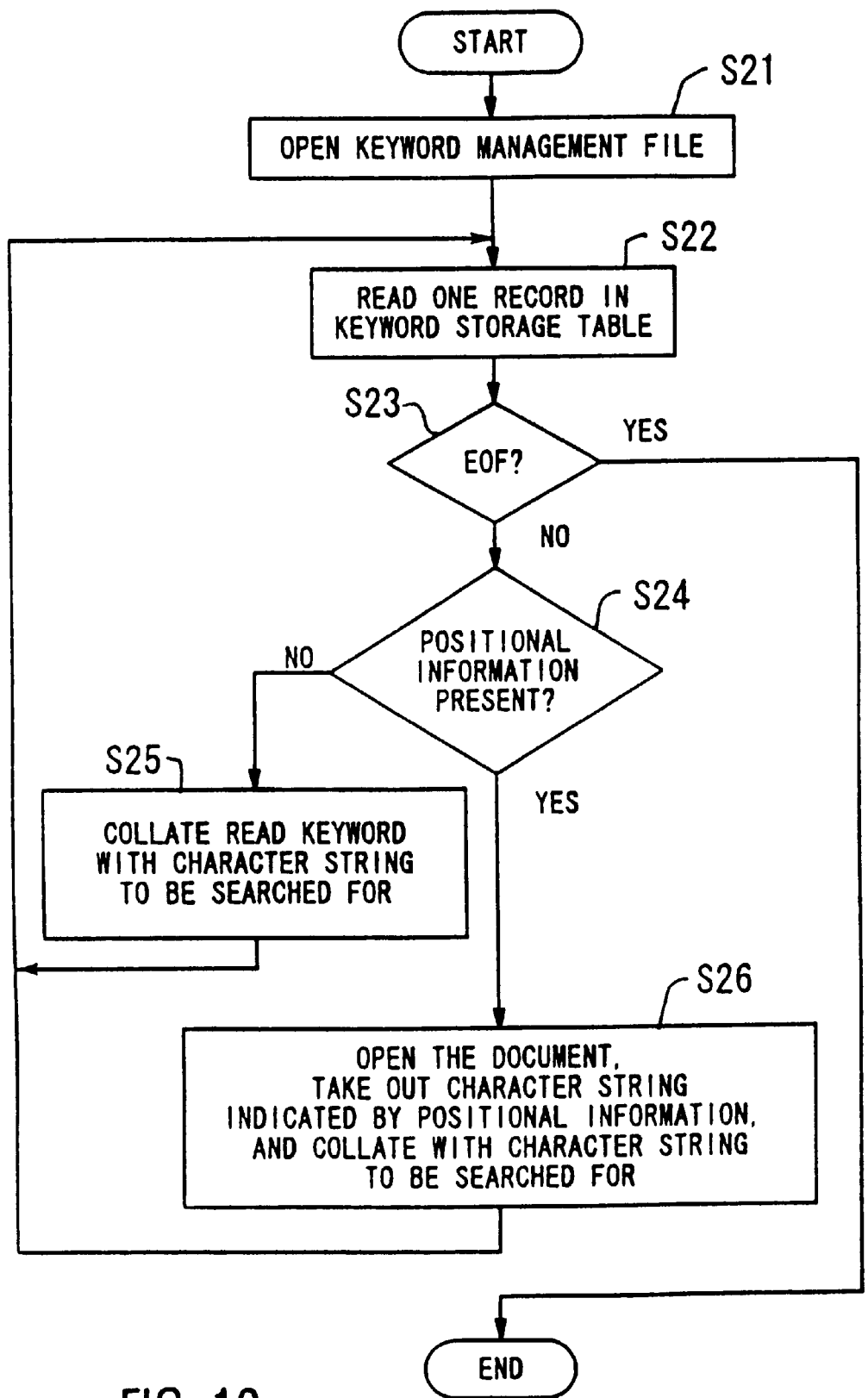
FIG. 10 is a flowchart showing a method of searching for a keyword.

FIG. 10 is a flowchart showing a method of searching for a keyword.

When the character string to be searched for is specified and the corresponding keyword in the document file is to be searched for, the keyword management file 32 is first opened (Step S21). Then, one record in the keyword storage table is read (Step S22). Next, it is determined whether this is the end of file (EOF) (Step S23). If the end of file is judged, the search ends.

If the end of file is not judged, it is determined whether the positional information is present in the read record (Step S24). If the positional information is absent, the keyword read from the keyword management file 32 is collated with the predetermined character string to be searched for (Step S25), and the process proceeds to the search of the next record. If it is judged in Step S24 that the positional information is present, the document file containing the character string indicated by the positional information is opened, the character string indicated by the positional information is taken out of the document file, and the character string is collated with the character string to be searched for (Step S26). The result of collation is displayed by the display unit.

Next, a method of generating a fixed format document from a marked document according to the present invention will be hereinafter described.

Figure 11:
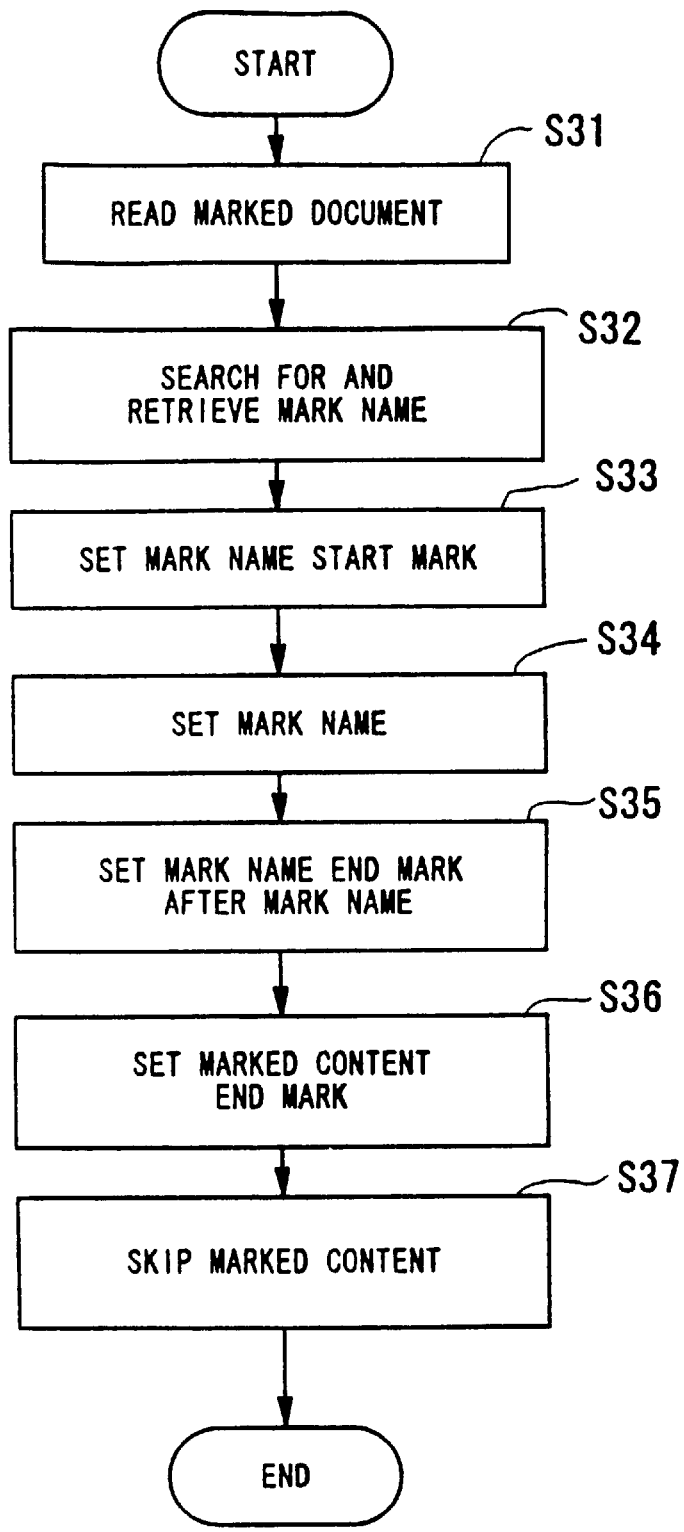
FIG. 11 is a flowchart illustrating a method of generating a fixed format document from a marked document according to the present invention.

FIG. 11 is a flowchart illustrating a method of generating a fixed format document from a marked document according to the present invention. A marked document, which is the source of a fixed format document to be generated, has a document structure wherein mark names are affixed to certain contents in accordance with marking rules.

To generate a fixed format document, first, a marked document already created is read (Step S31). A mark name contained in the document is searched for and retrieved (Step S32), and a mark name start mark is set (Step S33). Then, the retrieved mark name is set at a location following the mark name start mark (Step S34). A mark name end mark is set after the mark name (Step S35), and a marked content end mark is set following the end mark (Step S36). The marked content is skipped and is not retrieved (Step S37).

In this manner, a marked document is searched for mark names, the mark name start mark and the mark name end mark are set at locations preceding and following each mark name, respectively, the marked content end mark is inserted after the mark name end mark, and the marked content following the mark name is not retrieved. Alternatively, the marked content specified by the mark name is replaced by the marked content end mark. Consequently, the mark names remain as they are, and a fixed format document is generated such that only the marked contents are deleted.

FIG. 12 illustrates an example of marked document.

The illustrated marked document 50 is described in ESIS format. In the ESIS format, each line is composed of the initial character of a command, one or more parameters, and a line feed code.

In the example shown in FIG. 12, the first line of the marked document 50 includes a start-indicative command "(" and the parameter "ATHDOC" representing the marked document 50, and the last line of the marked document 50 includes an end-indicative command ")" and the parameter "ATHDOC", whereby the start and end of the marked document 50 are specified. A statement 51 at the second line consists of a command "-" and a character string as a parameter, the character string following the command "-" being a comment. Thus, when this document is searched for a required character string, that is, a substantial part of a database, for example, the content of the comment is ignored. Symbol "¥n" in the character string forming the comment denotes a line feed code used for the on-screen display etc.

A statement 52 at the third line begins with a command "A", and the third parameter in the statement 52, that is, "NAME" is a mark name. A substantial part of the database is written in the three lines 53 following the mark name. Namely, between the lines "(ATHMARK" and ")ATHMARK", the character string following the command "-" is a marked content.

Similarly, in the subsequent lines, mark names and their corresponding marked contents are written in pairs in this order, with a comment preceding and following each pair.

The following is a description of a fixed format document which is generated from the marked document 50 written as described above, according to a generation method of the present invention.

FIG. 13 illustrates an example of such fixed format document.

In the illustrated example, the fixed format document 60 contains not only the mark names and the marked contents in the marked document 50 but also the contents of the comments. For example, the content of the comment in the statement 51 of the marked document 50 is shown at top. Specifically, the character string "QUESTIONAIRE OF GRADUATION STUDY" appears first, then comes the remaining character string "NAME:" following the two line feeds.

The mark name "NAME" in the statement 52 is retrieved as soon as it is located. Then, following the content of the preceding comment are inserted in succession the mark name start mark, in this example, the mark "(", the retrieved mark name "NAME", the mark name end mark, in this example, the mark ")", and the marked content end mark, in this example, the mark "*".

Similarly, in the subsequent lines, the content of a comment, a mark name preceded by the mark name start mark and followed by the mark name end mark, and the marked content end mark are successively set in the order mentioned. In this case, since the marked contents are not inserted, the generated fixed format document 60 has no marked contents therein.

When generating the fixed format document 60 from the marked document 50, the types of marks to be affixed to the mark name and the like can be set in advance. Such setting can be made on a setting screen of an application program or by means of command parameters.

Figure 14:
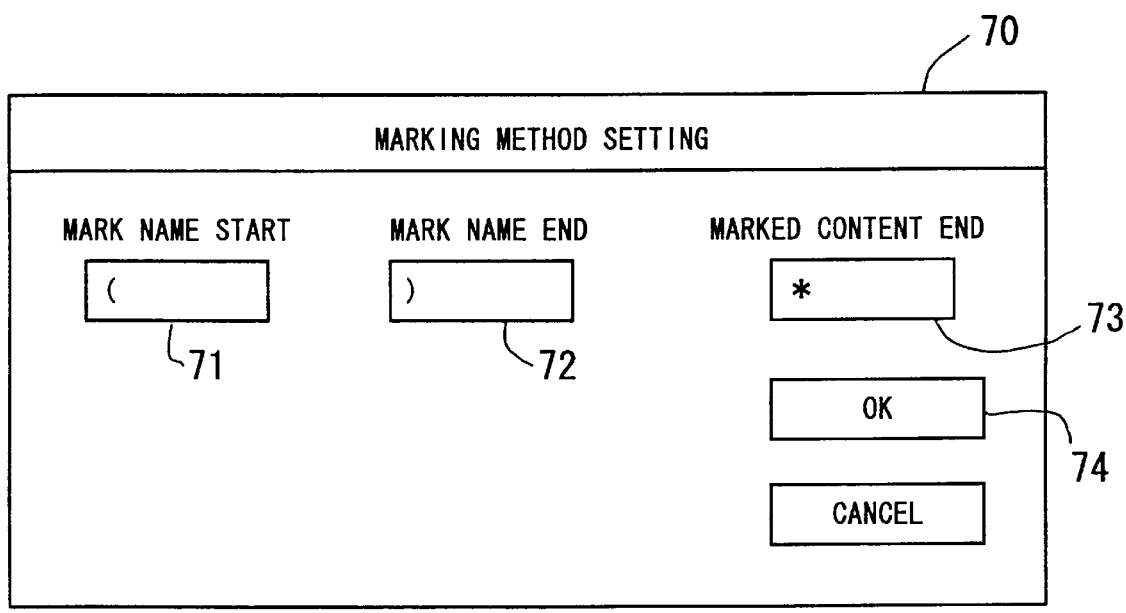
FIG. 14 is a diagram showing an example of marking method setting screen.

FIG. 14 illustrates an example of marking method setting screen. The marking method setting screen 70 is displayed after the marked document 50, from which the fixed format document 60 is to be generated, is selected or specified, for example. The setting screen 70 includes a text box 71 for the entry of the mark name start mark, a text box 72 for the entry of the mark name end mark, and a text box 73 for the entry of the marked content end mark, and these three types of marks can be set in their respective text boxes 71, 72 and 73. In the illustrated example, the marks "(",")" and "*" which are used to generate the fixed format document 60 of FIG. 13 are displayed. Although in the example, only one character is set for each mark, a plurality of characters may alternatively be set. After the marks entered in the respective text boxes 71, 72 and 73 are confirmed, the "OK" button 74 is pressed, whereupon generation of the fixed format document 60 is started.

The fixed format document 60 generated in this manner can be used as a questionnaire form to be filled out, for example. The questionnaire form is distributed to end users concerned via personal computer communications, for example, and the end users are only informed how to fill out the form, for example, that the answer to each item of the questionnaire should be entered in insert mode between the mark name end mark ")" and the marked content end mark "*". No further complicated rules are imposed on the end users. The questionnaire forms collected from the end users should have marked contents for the respective mark names entered at the specified locations; therefore, by using the fixed format documents, marked documents can be created by backward generation using the marks "(", ")" and "*" as keys. In this case, the forms collected from the end users concerned require no correction by an administrator or a proxy therefor and can be used almost directly.

Figure 15:
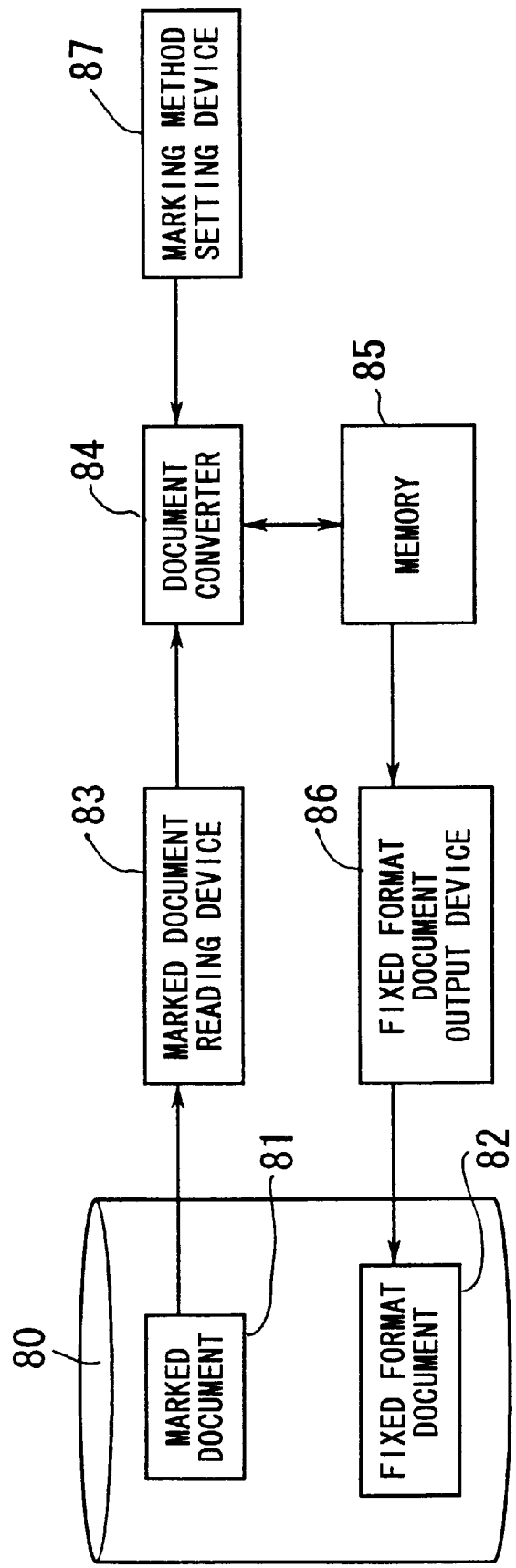
FIG. 15 is a block diagram showing, by way of example, the configuration of an apparatus for generating a fixed format document.

FIG. 15 is a block diagram showing an example of the configuration of an apparatus for generating a fixed format document.

The fixed format document generating apparatus comprises an external storage device 80 for storing a marked document 81 which is the source of a fixed format document to be generated, and a fixed format document 82 generated from the marked document; a marked document reading device 83 for reading in the marked document 81 stored in the external storage device 80; a document converter 84 for affixing identifiable marks to respective mark names in the marked document read by the marked document reading device 83 and deleting marked contents specified by the mark names, to thereby generate a fixed format document; a memory 85 in which document conversion is performed by the document converter 84; and a fixed format document output device 86 for transferring the fixed format document generated in the memory 85 to the external storage device 80 to be stored therein. The document converter 84 is connected to a marking method setting device 87 for setting the identifiable marks used in the document conversion.

In this fixed format document generating apparatus, when the marked document 81 stored in the external storage device 80 is read by the marked document reading device 83, the document converter 84 loads the marked document into the memory 85, searches for mark names in the marked document thus loaded, inserts a mark name start mark and a mark name end mark before and after each mark name, respectively, and inserts a marked content end mark after the mark name end mark. The document converter 84 deletes the marked contents following the mark names, thereby generating a fixed format document in the memory 85. The fixed format document in the memory 85 is stored in the external storage device 80 by the fixed format document output device 86.

Figure 16:
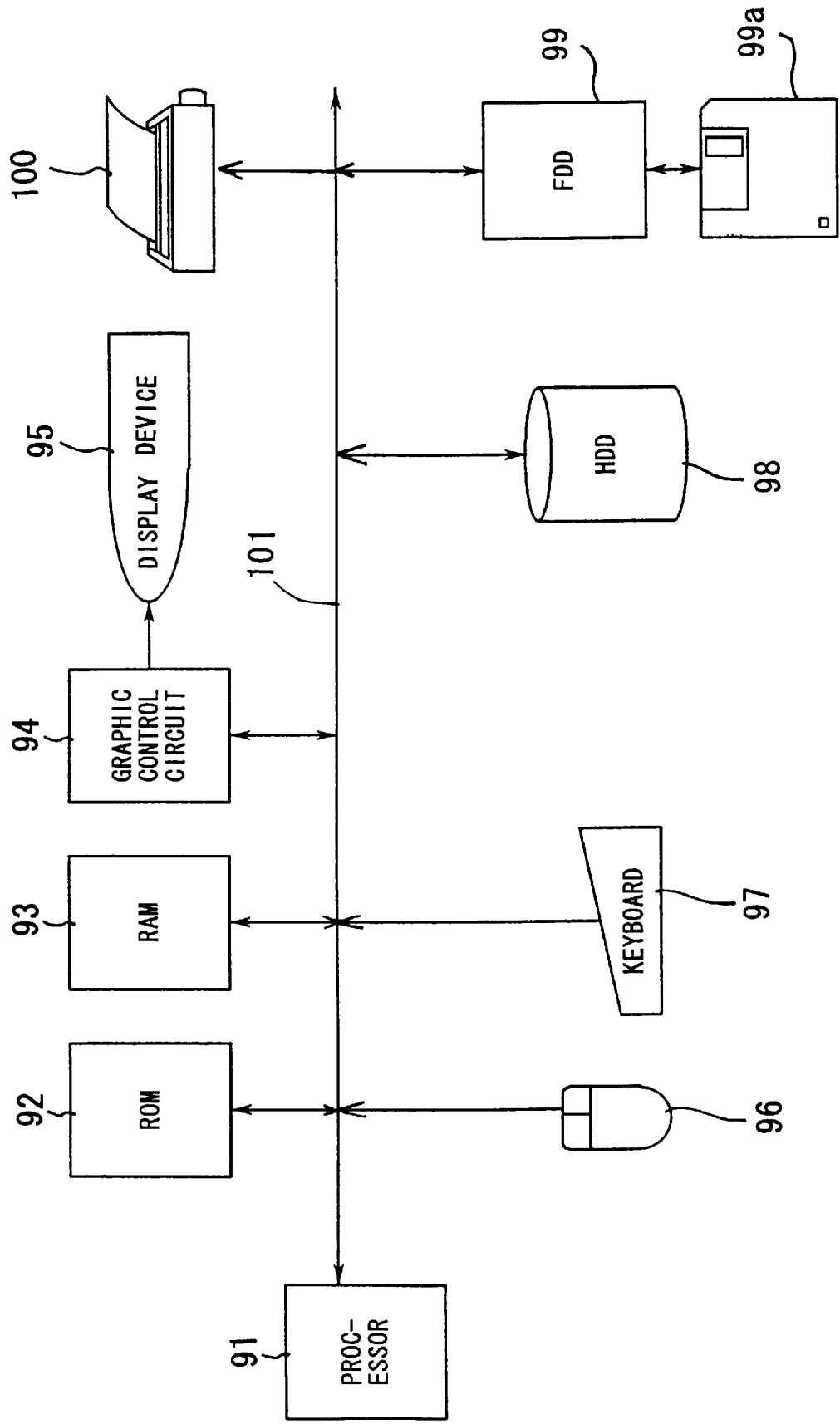
FIG. 16 is a diagram showing an example of hardware configuration of a computer system for carrying out the present invention.

FIG. 16 illustrates an example of the hardware configuration of a computer system for carrying out the present invention. As shown in FIG. 16, the computer system comprises a processor 91, a read-only memory (ROM) 92, a main memory (RAM) 93, a graphic control circuit 94 associated with a display device 95, a mouse 96, a keyboard 97, a hard disk drive (HDD) 98, a floppy disk drive (FDD) 99, and a printer 100, the elements being interconnected by a bus 101.

The processor 91 globally controls the entire computer system. The read-only memory 92 stores a program necessary for the startup, dictionaries, etc. In the main memory 93 are loaded a system program, an application program for list display in the instance updating apparatus or an application program for generating a fixed format document in the fixed format document generating apparatus and are stored data of read instances and the like in the instance updating apparatus or data including the mark names and the like read from the marked document, and fixed format document data generated from the loaded data in the fixed format document generating apparatus.

The graphic control circuit 94 includes a video memory etc., and converts the list display screen of instance groups read by the main memory 93 or a selection screen for selecting or specifying a marked document, the marking method setting screen, etc., into display signals which are then supplied to the display device 95. In accordance with the input display signals, the display device 95 displays a horizontal or vertical list screen on the basis of the received display signal or the selection screen, setting screen or the like.

The mouse 96 is a pointing device with which the mouse cursor displayed on the screen of the display device 95 can be moved, and also the instance to be updated on the list display screen can be selected by clicking the button, a marked document to be selected on the selection screen can be specified, or a command listed in various menus can be selected or specified by clicking the mouse button. The keyboard 97 is used for inputting characters etc. when the instance is rewritten or for the entry of marks etc. during the document conversion.

The hard disk drive 98 stores the system program, an application program for instance list display, the application program for the conversion to fixed format document, document files, a file for keyword management, files including marked documents and fixed format documents, etc. The floppy disk drive 99 is an external storage device which permits the document files or the marked document files stored on a floppy disk 99a to be transferred to the hard disk drive 98, and which also permits the data of, for example, list display result or the generated fixed format document files to be stored on the floppy disk 99a.

The display data of instance list, or the marked document data or fixed format document data may be output to the printer 100, so that the printer 100 prints the data on paper.

As described above, the present invention is configured so that the read instances are displayed by a list in the state in which inputting is impossible, and when the displayed instance is to be updated, the updating of instance to be updated is commanded from the displayed list so that only that instance can be inputted. For this reason, there is no need for switching to a special-purpose input screen when an instance is to be changed, and only necessary instances on the list can be changed. Therefore, there is no risk of inadvertently updating an unintended instance, so that the operation efficiency can be improved.

According to the present invention, to store a keyword extracted from a plurality of document files in a keyword management file, the upper limit of the number of stored characters is set, and, when the keyword has the number of characters up to the upper limit, the character string of keyword is stored in the keyword management file, while when the keyword has the number of characters exceeding the upper limit, the position where the keyword appears in the document is stored. Therefore, the size of the keyword management file can be made optimum, and the character string having all numbers of characters, extracted from a document file, can be managed as a keyword while the search efficiency is maintained to some degree by managing the keywords by putting them in one file.

According to the present invention, a marked document is searched for mark names, the mark name start mark and the mark name end mark are inserted before and after each mark name, respectively, the marked content end mark is inserted after the mark name end mark, and the resulting document is used as a fixed format document. The fixed format document generated in this manner may be distributed for reference to end users concerned, to have the end users create documents which are to be converted to marked documents. The documents collected from the end users require almost no correction by an administrator or a proxy therefor, whereby the efficiency of administrative work in processing marked documents is enhanced.

Further, the fixed format document thus generated is higher in reliability than that created by an administrator or a proxy therefor according to the marking rules.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of generating a fixed format document from a marked document containing a mark name and a marked content specified by the mark name, comprising the steps of:

reading a marked document created according to marking rules;

searching for and retrieving a mark name contained in the read marked document;

setting a mark name start mark;

setting the retrieved mark name after the mark name start mark;

setting a mark name end mark after the set mark name;

setting a marked content end mark after the mark name end mark; and skipping a marked content without retrieving the same, wherein said mark name corresponds to and is paired with said mark contents, with a comment preceding and following each pair of mark name and mark contents.

2. A fixed format document generation method according to claim 1, which further comprises the step of retrieving the content of a comment.

3. A fixed format document generation method according to claim 1, which further comprises the step of setting in advance the mark name start mark, the mark name end mark, and the marked content end mark.

4. A fixed format document generation method according to claim 1, wherein the marked document comprises an SGML document.

5. A fixed format document generation method according to claim 1, wherein the marked document comprises a document of ESIS format.

6. An apparatus for generating a fixed format document from a marked document containing a mark name and a marked content specified by the mark name, comprising:

an external storage device storing the marked document and a generated fixed format document, wherein said mark name corresponds to and is paired with said mark contents, with a comment preceding and following each Pair of mark name and mark contents;

a marked document reading device reading in the marked document stored in said external storage device;

a document converter affixing an identifiable mark to a mark name in the marked document read by said marked document reading device and deleting a marked content specified by the mark name, to thereby generate a fixed format document; and a fixed format document output device transferring the generated fixed format document to said external storage device to be stored therein.

7. An apparatus according to claim 6, which further comprises a marking method setting device setting the identifiable mark used in document conversion.

8. An apparatus according to claim 7, wherein said marking method setting device separately sets a mark name start mark to be inserted at a start position of the mark name, a mark name end mark to be inserted at an end position of the mark name, and a marked content end mark to be inserted at a position corresponding to the marked content specified by the mark name.

9. A method of creating a fixed format document from a marked document containing a mark name and a marked content specified by the mark name, wherein when the mark name is read from the marked document, a fixed format document is created by a process including affixing identifiable marks before and after the read mark name, respectively, and replacing the marked content specified by the mark name with another identifiable mark, and wherein said mark name corresponds to and is paired with said mark contents, with a comment preceding and following each pair of mark name and mark contents.

* * * * *